April 29, 1969  R. EICKER  3,441,652
FURNACE FOR CERAMIC DENTAL PRODUCTS
Filed Oct. 19, 1967

INVENTOR
ROBERT EICKER

BY *O. Herangist*

ATTORNEY

United States Patent Office 3,441,652
Patented Apr. 29, 1969

3,441,652
FURNACE FOR CERAMIC DENTAL PRODUCTS
Robert Eicker, Gevelsberg, Germany, assignor to Zahnfabrik Wienand Sohne & Co. G.m.b.H., Sprendlingen, Kreis Offenbach am Main, Germany, a corporation of Germany
Filed Oct. 19, 1967, Ser. No. 676,457
Int. Cl. H05b 3/60
U.S. Cl. 13—20                              7 Claims

ABSTRACT OF THE DISCLOSURE

A furnace for fusing ceramic dental products provided with a furnace chamber for fusing such products and a preliminary muffle directly contacting the walls of such chamber to derive heat therefrom adequate to perform preheating or drying of dental products prior to the same being placed in the furnace chamber to be fused.

Background of the invention

Although ceramic artificial teeth are readily available from commercially manufactured sources for use in the fabrication of intra-oral restorative devices, there are a number of types of ceramic dental products which require individual custom-type production to satisfy certain specific requirements for an individual patient, for example. One type of product which, in general, is not available from normal commercial production sources comprises ceramic jacket crowns which must be fabricated by a multi-layed built up technique, the individual layers of which must be dried and successively fired before the application of the next layer.

Other types of porcelain products comprise porcelain facings, veneers, porcelain bridges, porcelain inlays, and various other porcelain dental products, most, if not all, of which are fabricated by a successive step technique in which layers are applied to a base member of suitable type, fired, and then additional layers are applied and fired, all for purposes of producing a finished product of required shape, shade or color, and dimensions for particular use in a restorative device. Such multi-step technique primarily is required because of the substantial shrinkage of porcelain which occurs when the same is fired.

The various layers of porcelain referred to usually are applied in the form of a slurry, which is somewhat paste-like, and then is dried, prior to being fused or fired. Preferably, heat is used to finish the drying of the applied slurry layer as rapidly as possible so as to conserve the amount of time required to complete the ceramic dental product. Frequently at present, the drying of such applied layers occurs in a separate furnace from that in which firing or vitrification of the various layers occurs.

In recent years, improved structural and esthetic results have also been produced by firing raw porcelain dental products in a vacuum atmosphere primarily for purposes of increasing the density and, correspondingly, the strength, as well as the esthetic characteristics, particularly the translucency of the finished products. The application of vacuum to the products being fired, however, must occur before the outer surface of the product becomes sealed by vitrification. Accordingly, there is a certain time interval required in which the dental product is subjected to a vacuum atmosphere which usually occurs incident in the firing of the tooth.

The final firing temperature usually is not applied until satisfactory evacuation of the product has occurred. Hence, it will be seen from the foregoing that a substantial total amount of time can be and frequently is required to produce a custom-made ceramic dental restorative device through the repeated steps of applying usually moist layers of ceramic material, drying the same, subjecting each individual layer to evacuation prior to firing, and ultimately firing or fusing the same, following which the next layer is applied and the same procedure is repeated.

The most commonly used type of furnaces to effect the preliminary preheating or drying, as well as the ultimate evacuation and firing or fusing of the various layers comprising composite ceramic dental products of the type referred to above comprise ceramic containers or shells of relatively small capacity and capable of having a closure disposed in sealed relationship over an access opening for purposes of facilitating the application of suction to the interior of said container or shell to produce a negative pressure therein to induce the desired density and esthetic characteristics in the resulting product.

Heating of the interior of such container or shell usually is accomplished by the application of electrical resistance rods or coils of resistance wire applied to the exterior surface of said container or shell for transmission of heat by conduction through the wall of the container to the interior compartment in which the ceramic article is to be fused or vitrified. Heating the interior by this means is also time-consuming, even though only a relatively few minutes are involved in each operation. Nevertheless, the total time consumed in completing a single ceramic dental product frequently is substantial, due particularly to repeatedly opening the furnace to insert or remove an item, seal the furnace, evacuate it, and bring it up to fusing temperature for each step.

One type of furnace used to produce ceramic dental products by the application of vacuum incident to fusing the porcelain comprises the subject matter of Patent No. 3,128,326, dated Apr. 7, 1964. The purpose of the present invention is to offer certain improvements over the basic structure illustrated and claimed in said prior patent.

Summary of the invention

The principal object of the present invention is to provide an electrically heated furnace for fusing dental products molded in raw form from ceramic materials, said furnace including in combination a furnace chamber in which electrical resistance means are mounted on the interior to effect maximum efficiency in producing fusing temperatures for dental ceramic products within said chamber, closure means to seal said chamber, evacuating means connected to the chamber and operable to produce a desired degree of negative pressure while ceramic articles are being fused therein, and a preliminary muffle immediately adjacent said furnace and arranged to receive raw molded forms of dental articles and predry and preheat the same, said muffle being closed at one end and a portion of said closed end directly engaging preferably the upper portion of the furnace chamber to derive heat directly therefrom by conduction and in sufficient ranges of temperature to heat said raw molded forms to predry the same and the opposite end of said muffle having a removable door to close the opening through which said molded forms are placed within and removed from said muffle, even preliminary burning, short of fusing the molded forms, to remove expendable binder materials and the like, may occur in such muffle.

Another object of the invention is to employ electrical resistance means within said furnace chamber which comprises a spiral coil of ribbon-type resistance metal supported adjacent the interior wall surface of the furnace chamber and extending transversely thereto, whereby relatively low voltage, compared to conventionally used coil means, may be employed to energize the coil to suitable firing or fusing temperatures while maintaining more extensive reserve performance and longer life for the coil than is possible with conventional coiled electrical resistance wire heating elements of conventional shape.

A further object of the invention is to form the aforementioned furnace chamber in the shape of an inverted cup having an opening at the bottom which is sealed by a closure mounted for vertical movement toward and from said open bottom, the closure also supporting the dental products to be fired or fused within the furnace chamber, while the preliminary muffle for predrying and preheating the raw dental products prior to fusing preferably is arranged horizontally adjacent the upper end of the furnace chamber to effect maximum efficiency in transferring heat from the furnace chamber to the muffle by direct conduction and the outer end of said muffle comprises an access opening arranged to be closed by an appropriate door, thereby providing ready access to the muffle without disturbing operation of the furnace chamber and vice versa. Thus, the muffle and furnace may be used simultaneously for their respective functions and thus conserve time in laboratory operations.

Other advantages, details and objectives of the invention are set forth hereinafter in the following specification, as well as being illustrated in the accompanying drawing comprising a part thereof.

Description of the preferred embodiments

Figure 1:
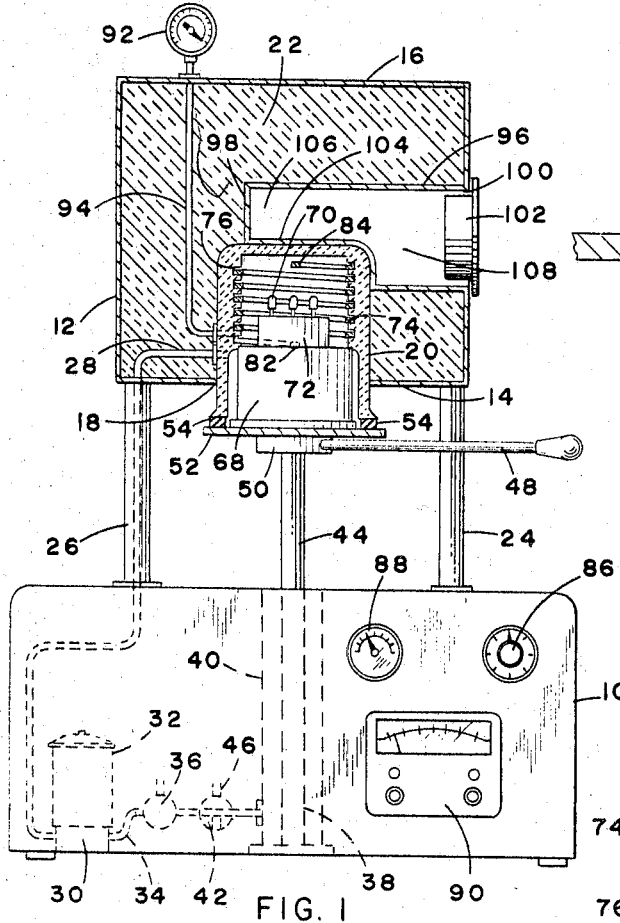
FIG. 1 is a side elevation, partly in vertical section, of a dental ceramic furnace embodying the principles of the present invention.

In the preferred overall arrnagement of the furnace illustrated in FIG. 1, it will be seen that a supporting base in the form of a cabinet or housing 10 is arranged to be placed upon a suitable bench or stand. Said base contains various types of control apparatus and actuating means which will be described in detail hereinafter. Surmounting the base and spaced vertically above the same is a jacket 12 which preferably is cylindrical and has a transverse bottom 14 and a horizontal top 16. The bottom has a central opening 18 through which the lower end of an inverted cup-shaped furnace chamber 20 extends, the outer walls thereof being insulated from the jacket 12 by appropriate insulation material which fills the space 22 between the jacket 12 and furnace chamber 20 for purposes of conserving heat within the interior of the chamber and also rendering the ambient atmosphere as comfortable as possible for dentists and technicians who operate the furnace.

The furnace chamber 20 preferably is formed from suitable ceramic material capable of withstanding the relatively high temperatures required to fuse porcelain, such as of the order of 2300° F. as an approximate maximum temperature, but without limitation thereto.

The furnace chamber 20 is secured against vertical movement within the jacket 12 by any suitable means, not shown.

The jacket 12 and its contents are supported an appropriate distance above the top of supporting base 10 by a plurality of posts 24 and 26. At least the post 26 is hollow for purposes of accommodating conduit means 28 extending at one end from the interior of chamber 20 and extending to the inlet end of a vacuum pump 30 positioned within the base housing 10. The pump 30 is operated by a suitable electric motor 32 or the like. The discharge conduit 34 from pump 30 transmits air from the interior of chamber 20 either to atmosphere, through an automatic relief valve 36 which is set to discharge at a predetermined pressure, or into the hollow interior 38 of a central sleeve 40 fixed within the base housing 10 and extending substantially to the top thereof.

A three-way valve 42 is manually operable to either control the admission of air under pressure to the interior 38 of sleeve 40 or to prevent the transmission of air thereto but, meanwhile, hold in equilibrium any previously discharged volume of air within the hollow interior 38 and thereby maintain in elevated position a vertically movable piston-like shaft 44 which is slidable within the hollow interior 38 of sleeve 40. As a third alternative, a three-way valve 42 may be moved to a third position in which the hollow interior 38 is connected to a discharge orifice 46 on valve 42, which communicates with the atmosphere, and is operable to permit the discharge of air from the hollow interior 38, when desired. This permits the piston-like shaft 40 to descend by gravity or as aided by manual actuation of laterally extending handle 48, which is connected to a head member 50 affixed centrally to closure 52. Said closure preferably is disc-like and formed from metal so as to be complementary to and extend at its periphery a short distance radially beyond the outer surface of the lower end of furnace chamber 20, as illustrated particularly in FIGS. 1, 4 and 5.

To effect sealing of the vacuum atmosphere within the chamber 20 when closure 52 is elevated to the position shown in FIG. 1 and operation of the vacuum pump 30 is instituted, an appropriate annular sealing gasket 54, of suitable silicone rubber or the like, is secured either to the terminal lower end of furnace chamber 20, but preferably to the upper peripheral surface of closure 52, so as to be retained in operative position by one of said members, while the other member is movable toward and from the same.

Figure 4:
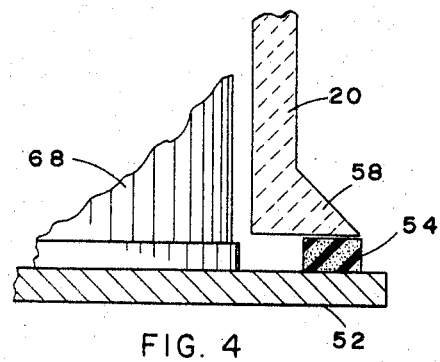
FIG. 4 is an enlarged fragmentary vertical sectional view of a portion of the furnace chamber and closure to illustrated details of one embodiment of sealing means.
Figure 5:
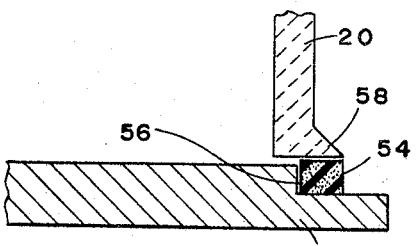
FIG. 5 is a view similar to FIG. 4, but showing details of another embodiment of sealing means and provisions on the closure to accommodate the same.

From FIGS. 4 and 5, it will be seen that two embodiments of supporting arrangements for the sealing gasket 54 are provided. In the arrangement shown in FIG. 5, it will be seen that an annular shoulder 56 is formed in the upper peripheral portion of closure 52 to provide a seat for the circular gasket 54, while in the arrangement of FIG. 4, no such seat is provided. In both of the arrangements of FIGS. 4 and 5, however, it is preferred that a beveled, exterior terminal flange 58 be provided on the lower extremity of furnace chamber 20 to provide an abutting surface of substantial area for the gasket 54, particularly to render the sealing afforded by gasket 54 highly efficient between the chamber 20 and closure 52. Suction within chamber 20, when applied, also enhances the sealing.

Figure 3:
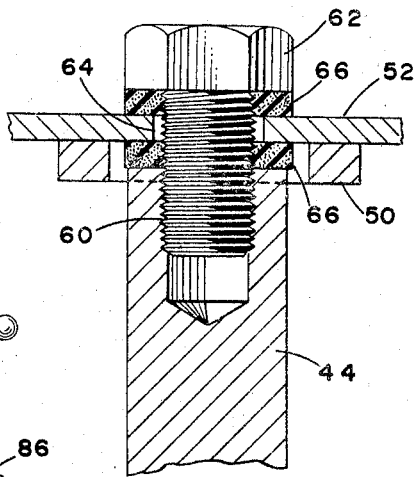
FIG. 3 is an enlarged, fragmentary, vertical sectional view of a connection between the closure for the furnace chamber and the means for moving the same vertically while permitting limited flexibility in the connection between said closure and means to effect even sealing of the furnance automatically.

To facilitate sealing engagement equally around the entire lower end opening of furnace chamber 20 and the closure 52, as afforded by the sealing gasket 54, it is preferred that limited flexibility be included in the attaching means by which the closure 52 is connected to the piston-like shaft 44. Details of one suitable connecting means are illustrated in FIG. 3, in which it will be seen that the upper end of shaft 44 is provided with a tapped hole 60 which receives a clamping bolt 62. A hole 64, preferably slightly larger in diameter than that of the threaded shank of bolt 62, is formed in the closure 52 so as to provide limited clearance between the walls of the hole and the threaded shank of the bolt.

Similar compressible washers 66 are placed upon the threaded shank of bolt 62 respectively against opposite surfaces of the closure 52 and coaxially with the hole 64 therein. Accordingly, when the bolt 62 is threaded sufficiently into the tapped hole 60, it will place the washers 66 under limited compression suitable to permit sufficient but restricted tilting of the closure 52 relative to the axis of shaft 44 and thus permit equal seating of the co-engaging peripheral portions of the chamber 20 and closure 52 with respect to the annular sealing gasket 54. The washers 66, if desired, may be made from material similar to that from which the gasket 54 is formed.

From FIG. 1, it will be noted that the lower end of furnace chamber 20 projects a limited distance below the bottom 14 of jacket 12 for purposes of permitting adequate, but limited reduction in temperature of the terminal end of chamber 20 to prevent the substantially high temperatures which are produced within the chamber 20 during ceramic firing operations from deleteriously affecting the sealing gasket 54, especially when made from resilient silicone compounds, certain of which are capable of sustaining reasonably elevated temperatures, not normally as high as those generated at least within the upper portion of the interior of chamber 20 during intended firing operations thereof.

Closure 52 not only serves to seal the interior of furnace chamber 20 when being utilized for fusing or vitrifying the ceramic dental products, but the closure also serves as supporting means for a suitable pedestal or platform 68 upon the upper surface of which exemplary ceramic dental products 70 are illustrated as being supported in FIG. 1. Any appropriate intermediate supporting block 72 or the like may be used to directly support the ceramic products 70, in accordance with the conventional practice.

Further in accordance with the principles of the present invention, the required fusing or vitrifying temperatures necessary to suitably fuse dental ceramic materials, such as feldspar and the like, are produced by the use of a coiled electrical resistance metallic element 74, which is supported on the interior of the upper portion of furnace chamber 20 by being inserted within an appropriate spiral groove 76, formed by molding or otherwise, directly into the inner surfaces of the side walls of the chamber 20.

Figure 2:
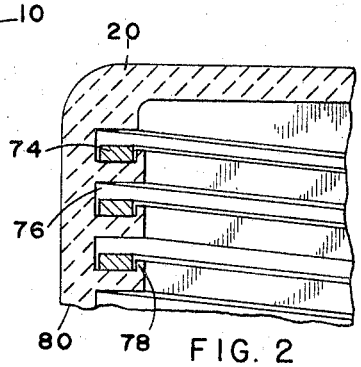
FIG. 2 is a fragmentary, enlarged vertical sectional view of a portion of the furnace chamber shown in FIG. 1 and illustrating details of one preferred embodiment for supporting electrical resistance means within the interior of said chamber.

As shown in FIG. 2, if desired, a short outer ridge or lip 78 may be formed so as to extend upward from the inner edge of the spiral shelf member 80 formed by the spiral grooves 76 and thereby serve to effectively retain the coiled metallic resistance element 74 in operative position within the chamber 20. To supply the resistance element 74 with current for purposes of energizing the same to develop the required temperatures, opposite ends of the coiled element 74 may be arranged to project through appropriate openings 82 and 84, under suitably sealed conditions, and the projecting ends of the resistance element as connected in circuit with appropriate electric power supply lines, not illustrated, but of conventional type utilized in regard to other forms of electric furnaces employing electrical resistance elements to furnish the heat thereto.

Said electric circuit also preferably includes appropriate switches to control the same, including, for example, a suitable timing switch 86 which, for example, may be of the type to determine the duration of time in which the circuit is to be maintained to provide heat within the chamber 20, while an additional timer switch 88, which preferably includes clock mechanism, is connected in the circuit of the resistance element 74 so as to permit setting of the same to regulate and determine the time when the circuit will be established, for example, if desired.

The timing switches 86 and 88 are mounted conveniently, for example, upon the front panel of the supporting base 10, as shown in exemplary manner in FIG. 1. Said front face also conveniently may be provided with a conventional temperature gauge 90. Further, for purposes of readily determining the amount of vacuum at any given instant within the furnace chamber 20, a conventional vacuum gauge 92 may be mounted, for example, upon the top of jacket 12 and connected through suitable tubing 94 to the interior of furnace chamber 20, as diagrammatically illustrated in FIG. 1.

One of the most important aspects of the present invention comprises the provision of a preliminary muffle 96 which is illustrated in vertical longitudinal sectional view in FIG. 1. It will be seen that said muffle preferably is elongated and extends substantially horizontally. The inner end 98 thereof is closed, and the opopsite end preferably is flush with the side wall of jacket 12 and comprises an access opening 100 through which raw or semi-prepared ceramic dental items are introduced into the muffle 96 and removed therefrom for purposes of pre-drying or preheating, or even prefiring, such items prior to introducing them, for example, into the furnace chamber 20 for final fusing under vacuum conditions. The opening 100 is arranged to be suitably closed against any appreciable loss of heat during operation by a complementary door 102 which preferably is provided with appropriate insulation of the type found in various types of laboratory furnaces, and especially those presently used for dental purposes.

Though other materials may be suitable for forming the muffle 96, in the preferred construction, it is formed from appropriate sheet metal of suitable thickness and durability and is supported at the outer end by appropriate connection to the jacket 12, for example, or auxiliary means within the jacket. Actual details of the manner of connecting the muffle 96 to the jacket or interior means therein are relatively unimportant since they do not comprise an essential part of the present invention. The important aspect of this part of the invention is that a portion of at least one wall which comprises the muffle 96 is in direct, heat-conducting engagement, preferably, with the upper portion of the furnace chamber 20. Appropriate means of effecting such direct heat conduction is illustrated in exemplary manner in FIG. 1. In said figure, it will be seen that the lower wall of the inner end of muffle 96 actually is shaped to form a recess, which is closely complementary to the upper portion of the furnace chamber 20 with which it is in direct contact. Said recess results in the muffle 96 actually comprising two heating portions or zones respectively identified as inner portion 106 and outer portion 108.

It will be evident from FIG. 1 that the inner portion 106 of the muffle interior has appreciably less vertical cross-sectional area than that of the outer portion 108. This fact, coupled with the further fact that the inner portion 106 is in closer proximity than portion 108 to the source of heat comprising the adjacent wall of furnace chamber 20 results in the inner portion 106 of the muffle having a higher temperature than the outer portion 108. This arrangement is convenient, particularly if fast drying or prefiring is required under certain circumstances, whereby the dental articles may be placed in inner portion 106. Providing the two portions or zones also affords greater capacity. Further, the horizontal arrangement of the muffle 96 readily affords substantial supporting surface for products to be processed therein.

The heat derived from furnace chamber 20 by muffle 96, to a substantial extent, is waste heat which otherwise would mostly be dissipated through the insulation material 22 which surrounds furnace chamber 20, as well as the muffle 96. Further, in general, the range of temperatures available within the muffle 96, including both the inner and outer portions 106 and 108 thereof, are very substantially less than the temperatures developed within the furnace chamber 20 for purposes of fusing and vitrifying ceramic dental products. Thus, providing a dentist with the convenience of a muffle for predrying, prefiring, and preheating raw or semi-prepared dental products is made possible at no readily computable increase in operating costs with respect to providing the necessary heat for the muffle. More importantly, however, operation of the furnace chamber 20 is totally independent of operating the muffle 96, whereby the furnace and muffle may be operated simultaneously and independently of each other, except for the fact that on those rare occasions when it may be desired to operate the muffle 96 alone, it is essential that the furnace 20 be heated to a sufficient extent to provide the necessary heat for the muffle 96, even though fusing of dental products may not be occurring at that particular time within the furnace chamber 20.

Referring further to FIG. 1, it would appear from the specific illustration therein that the access opening 100 to the muffle 96 is at one side of the apparatus, but such arrangement is primarily only for purposes of convenience of illustration. Actually, it is preferred to arrange the muffle 96 in such manner that the access opening 100 is in the front face of jacket 12, whereby operation of the muffle may occur conveniently, such as while the operator is observing or manipulating the various actuating items on the control panel of the supporting base 10, for example. If desired, the vacuum gauge likewise may be placed conveniently upon the front panel of the supporting base 10.

While the invention has been illustrated and described in its several preferred embodiments, it is to be understood that the invention is not to be limited to the precise details herein illustrated and described since the same may be carried out in other ways falling within the scope of the invention as claimed.

I claim:
1. An electrically heated furnace for fusing dental products molded into raw form from ceramic materials and initially maintained in desired form by expendable materials removable from such forms at temperatures substantially below those at which fusing of the ceramic materials occurs, said furnace comprising in combination,
   (a) an inverted cup-shaped furnace chamber having an opening in the bottom to receive ceramic articles to be fired to fuse the same into final condition,
   (b) a closure having sealing means thereon movable vertically toward and from said bottom opening of said furnace chamber to hermetically seal the chamber when in engagement with said bottom opening,
   (c) means on said closure arranged to support molded articles to be fused within said chamber when sealed by said closure,
   (d) electrical resistance heating means within said chamber and disposed adjacent the walls thereof,
   (e) evacuating means connected to said chamber and operable to produce a desired degree of negative pressure while ceramic articles are being fused within said chamber,
   (f) a preliminary muffle arranged to receive raw molded forms of dental articles and predry and heat the same, said muffle being closed at one end and a portion of said closed end directly engaging the upper portion of said furnace chamber to derive heat directly therefrom by conduction adequate to heat said raw molded forms to remove said expendable materials therefrom and the opposite end of said muffle being open for the introduction of such raw molded forms into said muffle for such predrying and heating solely by the heat conducted to said muffle from said furnace chamber,
   (g) a door removably positionable across said opposite end of said muffle independently of the operation of said closure for said furnace chamber,
   (h) insulation surrounding all walls of said furnace chamber and muffle except those portions thereof in direct contact with each other,
   (i) a jacket surrounding said insulation and having openings therein receiving portions of the open ends of said furnace chamber and muffle,
   (j) a base having means supporting said jacket and furnace chamber in an elevated position spaced above said base, and
   (k) means to move said closure for said furnace chamber vertically toward and from said opening in the bottom thereof.

2. The furnace according to claim 1 in which said preliminary muffle is substantially horizontal and the inner end thereof is smaller in vertical cross-section than the outer end to develop a higher temperature than the outer end and thereby provide a plurality of heating zones respectively having different temperatures for different selected purposes.

3. The furnace according to claim 1 in which the means supporting said inverted furnace chamber in spaced relationship above said base comprises at least one post extending between said chamber and base, said post being hollow and at least partially providing passage means between the interior of said chamber and said evacuating means.

4. The furnace according to claim 1 in which said means to move said closure for said furnace chamber comprises a vertically movable shaft, and said closure being connected to the upper end of said shaft by means having at least limited flexibility to permit said closure to close said bottom opening with substantially even sealing engagement around the entire circumference thereof.

5. The furnace according to claim 1 in which said electrical resistance heating means comprises a coiled flat ribbon of resistance-type metal supported adjacent the inner wall of said furnace chamber, said ribbon extending substantially transversely to the vertical axis of said chamber.

6. The furnace according to claim 1 in which said furnace chamber is formed from ceramic material having high heat resistance characteristics and said preliminary muffle comprises a substantially horizontal metal shell having at least a portion of the wall thereof in direct engagement with a portion of said furnace to effect efficient heat transfer from said chamber to the interior of said preliminary muffle.

7. The furnace according to claim 6 in which the wall of said metal shell which engages said furnace chamber is shaped to provide a recess complementary to the portion of said chamber engaged thereby and said recessed portion of said metal shell comprising the innermost end of said preliminary muffle and said end being smaller in vertical cross-section than the opposite outermost portion of said muffle, whereby two sections respectively of different volumes are provided in said muffle, the innermost section of smaller volume being heated to a higher temperature than said other section to provide heating zones for different selected purposes.

References Cited

UNITED STATES PATENTS

| 1,845,497 | 2/1932 | Hanson | 13—20 |
| 2,039,165 | 4/1936 | Hayakawa | 13—20 X |
| 2,678,958 | 5/1954 | Hintenberger | 13—20 |
| 3,112,919 | 12/1963 | Gunow | 13—20 X |
| 3,128,326 | 4/1964 | Hintenberger | 13—31 |

BERNARD A. GILHEANY, *Primary Examiner.*

H. B. GILSON, *Assistant Examiner.*

U.S. Cl. X.R.

13—31